(12) United States Patent
Ishibashi (10) Patent No.: US 11,731,462 B2
(45) Date of Patent: Aug. 22, 2023

(54) TIRE

(71) Applicant: SUMITOMO RUBBER INDUSTRIES, LTD., Hyogo (JP)

(72) Inventor: Takashi Ishibashi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 156 days.

(21) Appl. No.: 17/231,596

(22) Filed: Apr. 15, 2021

(65) Prior Publication Data

US 2021/0339569 A1 Nov. 4, 2021

(30) Foreign Application Priority Data

Apr. 30, 2020 (JP) ................................. 2020-080527

(51) Int. Cl.
*B60C 11/03* (2006.01)
*B60C 11/13* (2006.01)

(52) U.S. Cl.
CPC ...... *B60C 11/0302* (2013.01); *B60C 11/0306* (2013.01); *B60C 11/1392* (2013.01)

(58) Field of Classification Search
CPC ............. B60C 11/0302; B60C 11/0306; B60C 11/1392; B60C 11/1384; B60C 11/11
USPC .................................................... 156/209.1
See application file for complete search history.

(56) References Cited

U.S. PATENT DOCUMENTS

| 6,405,772 | B1* | 6/2002 | Suzuki | ................ B60C 11/1384 |
| | | | | 152/209.15 |
| 2005/0217775 | A1* | 10/2005 | Metz | ....................... B60C 11/13 |
| | | | | 152/209.21 |
| 2012/0067477 | A1* | 3/2012 | Berzins | ............... B60C 11/0306 |
| | | | | 152/209.15 |
| 2013/0206298 | A1* | 8/2013 | Guillermou | ............. B60C 11/13 |
| | | | | 152/209.18 |

FOREIGN PATENT DOCUMENTS

JP 2009-23601 A 2/2009

* cited by examiner

*Primary Examiner* — Eric Hug
(74) *Attorney, Agent, or Firm* — Greenblum & Bernstein, P.L.C.

(57) ABSTRACT

A tire has a tread portion bound with an intended rotational direction. The tread portion is provided with at least one block. Each block includes a ground contacting surface, which is defined by edges, and side surfaces positioned radially inside the ground contacting surface. The edges include a heel-side edge located on a heel side in the rotational direction and a toe-side side edge extending toward a toe side in the rotational direction from the heel-side edge. The heel-side edge is connected to one of the side surfaces without having a chamfer portion therebetween. At least a toe-side region, which is a region positioned on the toe side in the rotational direction, of the toe-side side edge is connected to the side surfaces each with the chamfer portion therebetween.

19 Claims, 8 Drawing Sheets

TIRE

This application claims the benefit of foreign priority to Japanese Patent Applications No. JP2020-080527, filed Apr. 30, 2020, which is incorporated by reference in its entirety.

TECHNICAL FIELD

The present invention relates to a tire.

BACKGROUND ART

In the following Patent Literature 1, a pneumatic tire is proposed which is provided in blocks with chamfer-like curved surfaces. The above pneumatic tire is expected to improve wear resistance and wet performance by the chamfered portions.

PRIOR ART DOCUMENT

Patent Document

[Patent Document 1]
Unexamined Japanese Patent Application Publication No. 2009-23601

SUMMARY OF THE INVENTION

Problems to be Solved by the Invention

In recent years, due to the improvement of vehicle performance, further improvement of the wet performance is desired. As a result of various studies on this point, the inventors found that the wet performance could be further improved by improving the arrangement and the like of the chamfered portions in tires bound with an intended rotational direction, which lead to the completion of the present invention.

The present invention was made in view of the above, and a primary object thereof is to exert excellent wet performance in tires bound with an intended rotational direction.

Means for Solving the Problems

The present invention is a tire including a tread portion bound with an intended rotational direction, wherein the tread portion is provided with at least one block, each block includes a ground contacting surface and side surfaces, the ground contacting surface being defined by edges, and the side surfaces being positioned radially inside the ground contacting surface, the edges include a heel-side edge located on a heel side in the rotational direction and a toe-side side edge extending toward a toe side in the rotational direction from the heel-side edge, the heel-side edge is connected to one of the side surfaces without having a chamfer portion therebetween, and at least a toe-side region, which is a region positioned on the toe side in the rotational direction, of the toe-side side edge is connected to the side surfaces each with the chamfer portion therebetween.

In the pneumatic tire according to the present invention, it is preferred that the toe-side side edge includes a pair of side portion edges extending from both ends of the heel-side edge.

In the pneumatic tire according to the present invention, it is preferred that the toe-side side edge includes a toe-side edge which is opposite the heel-side edge and connects the pair of the side portion edges.

In the pneumatic tire according to the present invention, it is preferred that at least one of the two side portion edges is connected over an entire region thereof to one of the side surfaces with the chamfer portion therebetween.

In the pneumatic tire according to the present invention, it is preferred that both of the two side portion edges are connected over an entire region thereof to the side surfaces each with the chamfer portion therebetween.

In the pneumatic tire according to the present invention, it is preferred that the ground contacting surface has a quadrangular shape.

In the pneumatic tire according to the present invention, it is preferred that the heel-side edge extends at an angle of 30 degrees or less with respect to a tire axial direction.

In the pneumatic tire according to the present invention, it is preferred that the heel-side edge is curved so as to be concave toward the toe side.

In the pneumatic tire according to the present invention, it is preferred that a width of each chamfer portion is 5 mm or more and 15 mm or less in a tread plan view.

In the pneumatic tire according to the present invention, it is preferred that a width of each chamfer portion is greater than a length in the tire radial direction of each chamfer portion in a tread plan view.

In the pneumatic tire according to the present invention, it is preferred that a length in the tire radial direction of each chamfer portion is 0.3% or more and 5.0% or less of a length in a tire axial direction of the ground contacting surface.

In the pneumatic tire according to the present invention, it is preferred that each chamfer portion includes an inclined surface arranged between a respective one of the edges and a respective one of the side surfaces, and in a lateral cross-sectional view of each block, the inclined surface is curved.

In the pneumatic tire according to the present invention, it is preferred that the inclined surface is curved so as to be convex outward in the tire radial direction.

In the pneumatic tire according to the present invention, it is preferred that each block is surrounded by a groove, and the groove includes a tie bar formed by a groove bottom thereof being raised.

In the pneumatic tire according to the present invention, it is preferred that the tie bar is connected with one of the side surfaces which is connected with the heel-side edge.

Effects of the Invention

By adopting the above configuration, the tire of the present invention can exert excellent wet performance.

MODE FOR CARRYING OUT THE INVENTION

An embodiment of the present invention will now be described in conjunction with accompanying drawings.

Figure 1:
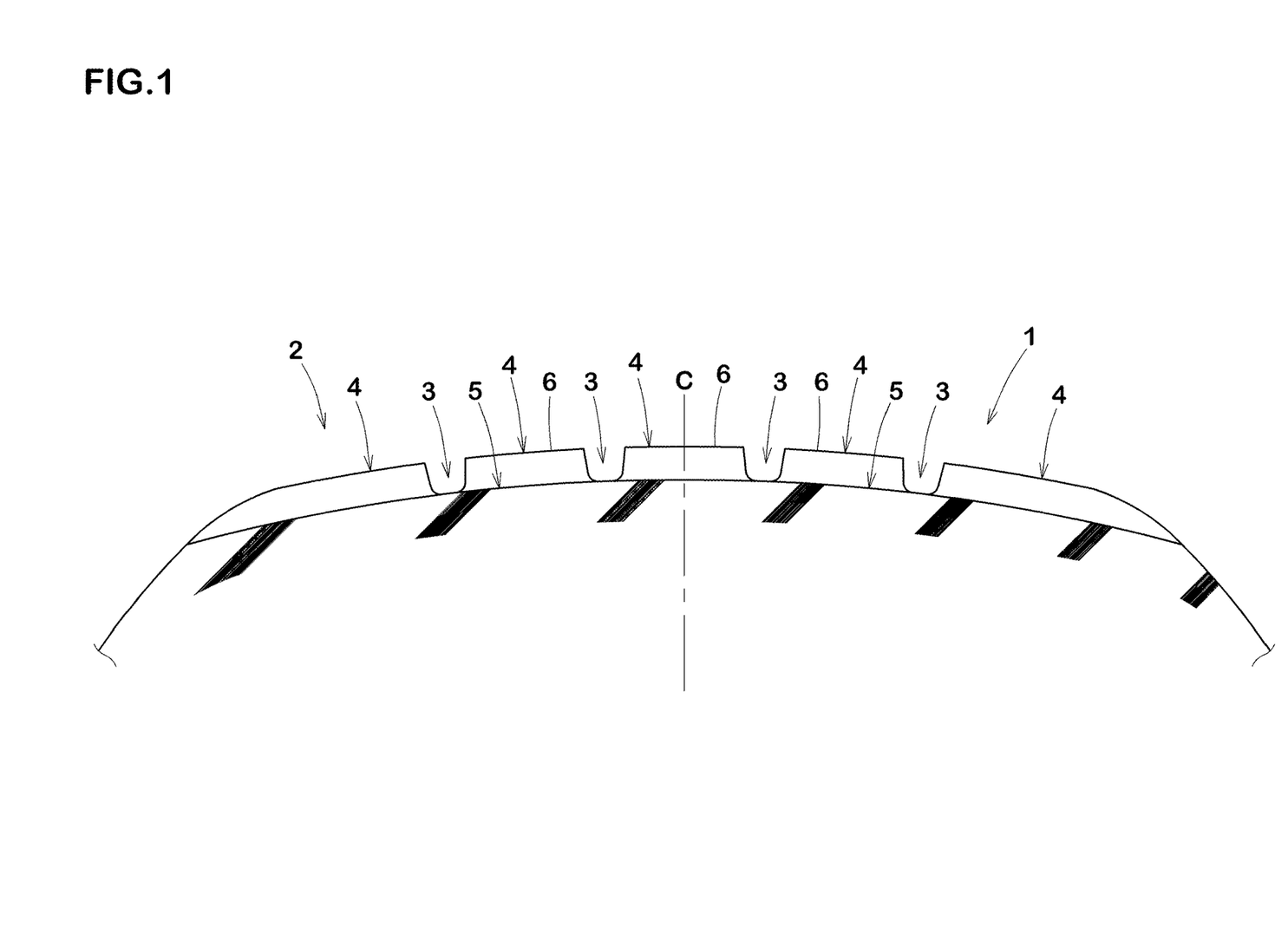
FIG. 1 a lateral cross-sectional view of a tread portion of a tire according to an embodiment of the present invention.

FIG. 1 shows a lateral cross-sectional view of a tread portion 2 of a tire 1 of this embodiment. It should be noted that FIG. 1 is a meridian cross-section passing through a tire rotational axis of the tire 1 in a standard state. The tire 1 of the present embodiment is suitably used as a pneumatic tire for a passenger car, for example. However, the present invention is not limited to such an embodiment, and the tire 1 of the present invention may be used for a heavy-duty tire, for example.

In the case of pneumatic tires for which various standards are specified, the "standard state" is a state in which the tire is mounted on a standard rim, inflated to a standard inner pressure, and loaded with no tire load. In the case of tires for which various standards are not specified, or non-pneumatic tires, the above standard state means the standard operating state depending on the intended use of the tires loaded with no tire load. In the present specification, unless otherwise noted, the dimensions and the like of various parts of the tire are the values measured in the standard state described above. It should be noted that each configuration described in the present specification shall allow for the normal errors contained in rubber molded products.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 has the tread portion 2 bound with an intended rotational direction. The rotational direction (R) is indicated by letters or symbols on sidewall portions or the like (not shown), for example. Further, in some of the figures of the present specification, the rotational direction (R) is indicated by an arrow.

The tread portion 2 has a plurality of main grooves 3 extending continuously in a tire circumferential direction and a plurality of land regions 4 divided by these grooves, for example. The land regions 4 include a plurality of blocks 6 divided by a plurality of lateral grooves 5. Thereby, at least one block 6 is formed in the tread portion 2. Each block 6 is arranged so as to be surrounded by the grooves.

Figure 2:
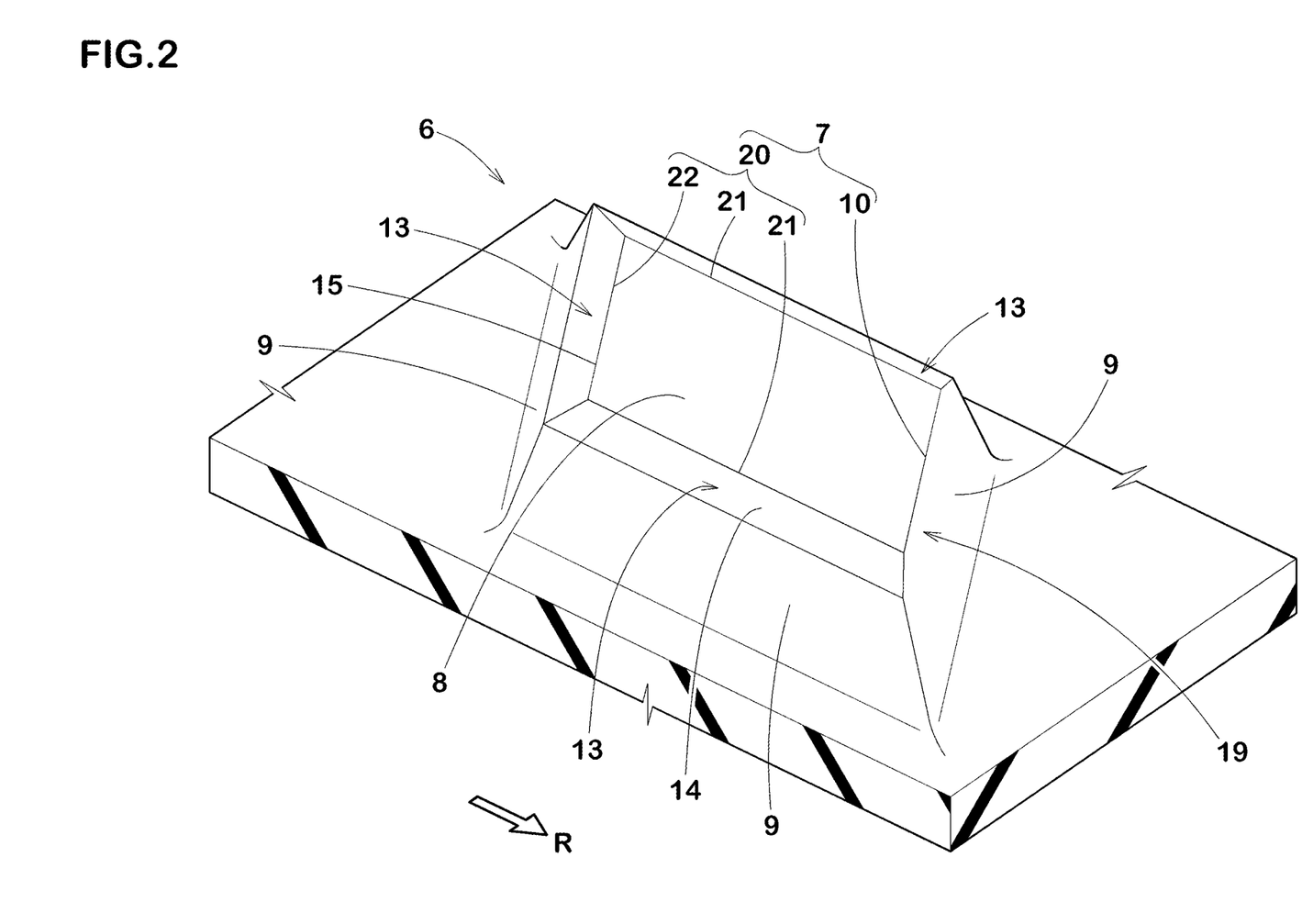
FIG. 2 an enlarged perspective view of one of blocks of FIG. 1.
Figure 3:
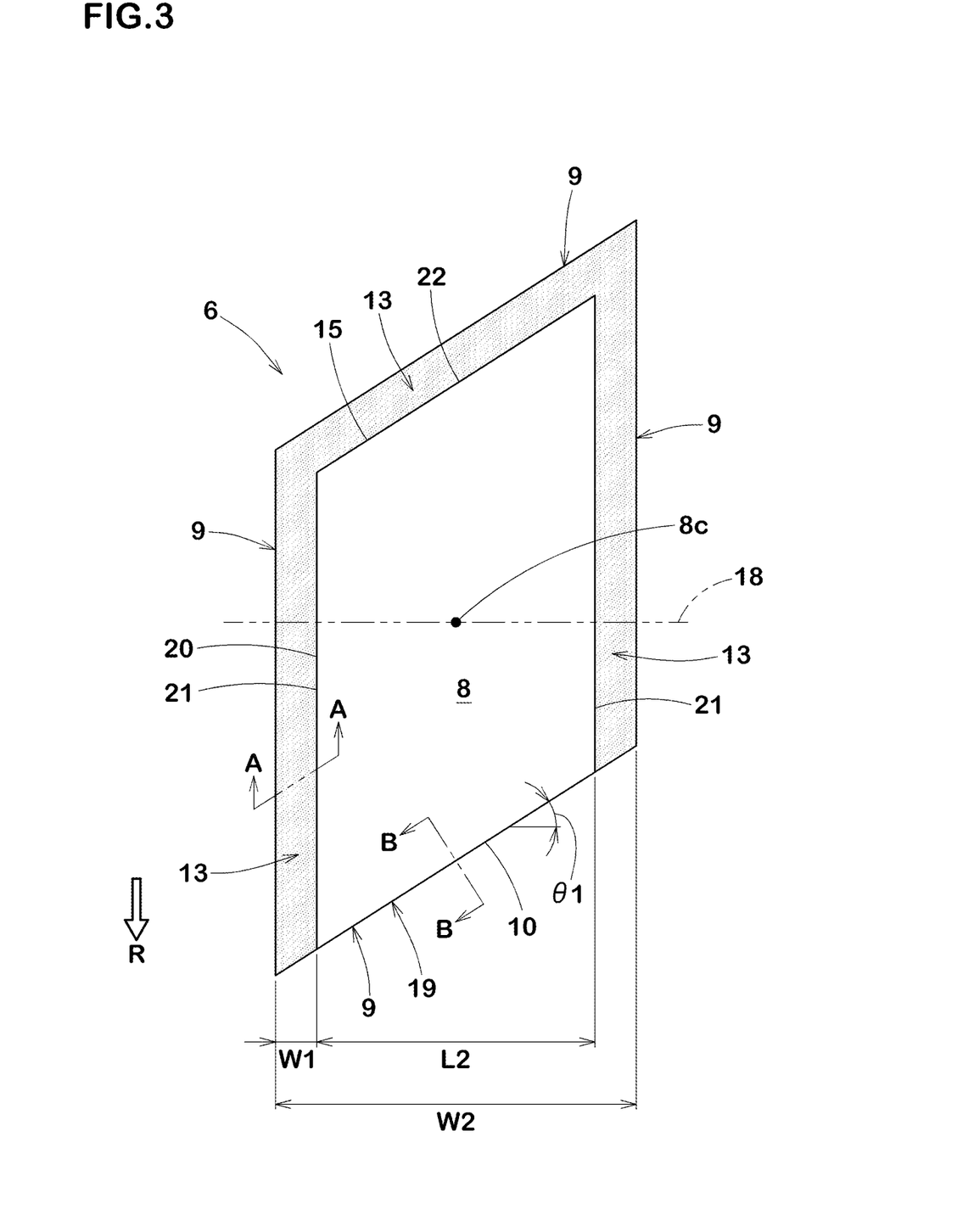
FIG. 3 an enlarged plan view of one of the blocks of FIG. 1.

FIG. 2 shows an enlarged perspective view of one of the blocks 6. FIG. 3 shows an enlarged plan view of one of the blocks 6. As shown in FIGS. 2 and 3, each block 6 includes a ground contacting surface 8 defined by edges 7 and side surfaces 9 positioned radially inside the ground contacting surface 8.

The ground contacting surface 8 is defined as follows. That is, when the tire 1 in the standard state is in contact with a flat surface with zero camber angle by being loaded with a standard tire load, the outer surface of the block 6 in contact with the flat surface is defined as the ground contacting surface 8 described above.

In the case of pneumatic tires for which various standards are specified, the "standard tire load" is a tire load specified for the concerned tire by a standard included in a standardization system on which the tire is based, and the "maximum load capacity" in JATMA, maximum value listed in "TIRE LOAD LIMITS AT VARIOUS COLD INFLATION PRESSURES" table in TRA, and "LOAD CAPACITY" in ETRTO. Further, in the case of tires for which various standards are not specified, or non-pneumatic tires, the "standard tire load" refers to the load applied to a single tire in its standard use state. The "standard use state" refers to a state in which the tires are mounted on a standard vehicle for the intended use of the tires, and the vehicle is stationary on a flat road surface in a roadworthy condition.

The edges 7 include a heel-side edge 10 located on the heel side in the rotational direction (R) (hereinafter referred to simply as the "heel side") and a toe-side side edge 20 extending toward the toe side in the rotational direction (R) (hereinafter referred to simply as the "toe side") from the heel-side edge 10. The heel-side edge 10 is the edge located radially outward of the side surface 9, which faces the heel side, of each of the blocks 6. The heel-side edge 10 is connected to the side surface 9 without having a chamfer portion 13 therebetween. For easy understanding of the configuration, the chamfer portion 13 is shaded in FIG. 3 and in a diagram showing the plan view of the block in the present specification.

Figure 4:
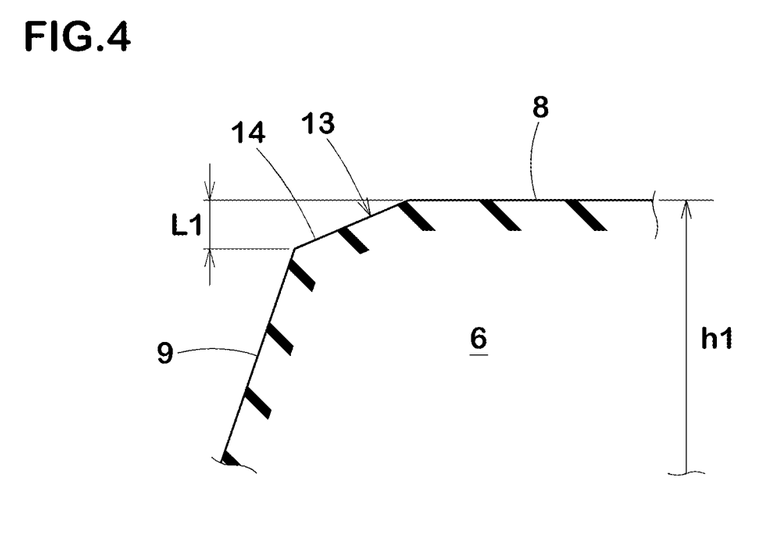
FIG. 4 a cross sectional view taken along A-A line of FIG. 3.
Figure 5:
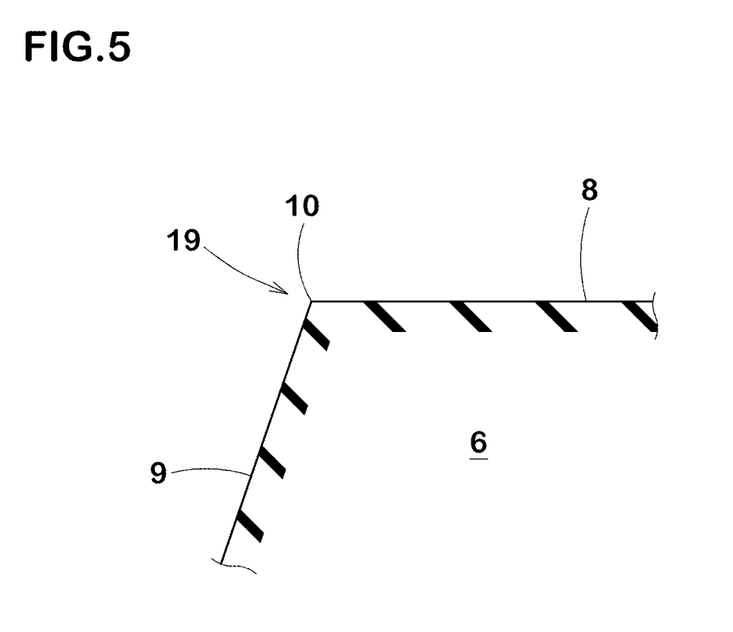
FIG. 5 a cross sectional view taken along B-B line of FIG. 3.

FIG. 4 shows a cross sectional view taken along A-A line of FIG. 3 as the cross sectional view of the chamfer portion 13. FIG. 5 shows a cross sectional view taken along B-B line of FIG. 3 as the cross sectional view of a non-chamfered portion 19. As shown in FIG. 4, the chamfer portion 13 includes inclined surfaces 14 each inclined between the ground contacting surface 8 and a respective one of the side surfaces 9. In the lateral cross-sectional view of the block, each of the inclined surfaces 14 may be curved so as to be convex outward in the tire radial direction or curved so as to be concave to the opposite side.

As shown in FIG. 5, the non-chamfered portion 19 (in the present embodiment, it corresponds to a corner portion including the wheel-side edge 10) is formed with an edge (heel-side edge 10) which is a ridge line of the ground contacting surface and the side surface connected together. It should be noted that, as each of the blocks 6 is a molded rubber product, it goes without saying that the aforementioned ridge has a certain width. For this reason, in the present specification, the ground contacting surfaces 8 and the side surfaces 9, which are connected by ridges having a width of 0.5 mm or less, are treated as the non-chamfered portions 19.

As shown in FIG. 3, at least a toe-side region 15, which is a region positioned on the toe side in the rotational direction, of the toe-side side edge 20 is connected to the side surface 9 with the chamfer portion 13 therebetween. The toe-side region 15 is a region on the toe side in the rotational direction (R) of a virtual linear line 18 extending parallel to a tire axial direction passing through a centroid (8c) of the ground contacting surface 8 of each of the blocks 6.

The tire of the present invention can exert excellent wet performance by adopting the above configuration. The following mechanisms can be inferred as reasons for this.

In the tire of the present invention, the heel-side edge 10 is connected to the side surface 9 without the chamfer portion 13 therebetween, therefore, when each of the blocks 6 comes into contact with a wet road surface, it is difficult for water to get into between the ground contacting surface 8 and the road surface. Further, since the toe-side region 15 is connected to the side surface 9 with the chamfer portion 13 therebetween, the water stepped on by the block 6 is discharged toward the toe-side region 15 as the tire rotates. It is presumed that the tire of the present invention exerts excellent wet performance by such a mechanism.

The more detailed configuration of the present embodiment will be described below. As shown in FIGS. 2 and 3, a width W2 in the tire axial direction of each of the blocks 6 of the present embodiment preferably satisfies the following expression (1), and more preferably the following expression (2), for example. While such relatively wide blocks are excellent in steering stability on a dry road surface and wear resistance, a water film is likely to be formed in the central portion of each of the ground contacting surfaces, therefore, anti-hydroplaning performance tends to be impaired. By applying the above-described configuration of the present invention to such wide blocks, excellent wet performance is exerted while maintaining the steering stability and the wear resistance.

$$W2 \geq 30 \text{ mm} \tag{1}$$

$$30 \text{ mm} \leq W2 \leq 60 \text{ mm} \tag{2}$$

As shown in FIG. 3, each of the ground contacting surfaces 8 has a quadrangular shape, for example, and in the present embodiment, it has a parallelogram shape. However, the ground contacting surface 8 of each of the blocks 6 of the present invention is not limited to such an embodiment, and, for example, a triangular shape, a trapezoidal shape, a polygonal shape, a circular shape, an elliptical shape, or the like can be adopted.

The heel-side edge 10 is connected to the side surface 9 without having the chamfer portion 13 therebetween in at least in the major part thereof. The heel-side edge 10 of the present embodiment is connected to the side surface 9 without having the chamfer portion 13 therebetween in an entire area thereof. As a result, the above-mentioned effect is surely exerted.

The heel-side edge 10 extends in the tire axial direction. An angle θ1 with respect to the tire axial direction of the heel-side edge 10 of the present embodiment preferably satisfies the following expression (3), and more preferably the following expression (4). The side surface 9 connected to the heel-side edge 10 is flat. The heel-side edges 10 and the side surfaces 9 configured as such can easily cut the water film when they comes into contact with the road surface, therefore, the anti-hydroplaning performance can be improved.

$$20 \text{ degrees} \leq \theta1 \leq 40 \text{ degrees} \tag{3}$$

$$\theta1 \leq 30 \text{ degrees} \tag{4}$$

The toe-side side edge 20 includes a pair of side portion edges 21 and a toe-side edge 22. The side portion edges 21 are the edges located radially outer side of the side surfaces 9, which face one side or the other side in the tire axial direction, of the block 6. The pair of the side portion edges 21 extend from both ends of the heel-side edge 10. In the present embodiment, the pair of the side portion edges 21 extend parallel to each other. The toe-side edge 22 is the edge located radially outer side of the side surface 9 which faces the toe side of the block 6. The toe-side edge 22 is opposite the heel-side edge 10, and connects the pair of the side portion edges 21. The toe-side edge 22 extends parallel to the heel-side edge 10.

The side portion edges 21 each include, at least in the toe-side region 15, a portion connected to the side surface 9 with the chamfer portion 13 therebetween (hereinafter, such an embodiment may be simply referred to as "the edge is in contact with the chamfer portion 13"). In a preferred embodiment, at least one of the two side portion edges 21 is in contact with the chamfer portion 13 over a majority of a length thereof and the entire region included in the toe-side region 15 is in contact with the chamfer portion 13. In a more preferred embodiment, at least one of the two side portion edges 21 is in contact in its entire region (meaning the entire region from the heel-side edge 10 to the toe-side edge 22) with the chamfer portion 13. As a further more preferred embodiment, in the present embodiment, both of the two side portion edges 21 are in contact with the chamfer portions 13 in their entire region. The side portion edges 21 configured as such improve the wear resistance and uniformize the ground pressure distribution in the ground contacting surface, therefore, they are helpful for improving the steering stability.

It is preferred that the toe-side edge 22 is in contact with the chamfer portion 13 in at least a major part thereof. As a more preferred embodiment, the toe-side edge 22 of the present embodiment is in contact with the chamfer portion 13 in an entire region thereof.

In a further preferred embodiment, the entire region of the toe-side side edge 20 (that is, the entire region of a pair of the side portion edges 21 and the toe-side edge 22) is in contact with the chamfer portions 13. Therefore, the wet performance is further improved.

As shown in FIG. 3, a width W1 of the chamfer portion 13 is 5 mm or more and 15 mm or less in the tread plan view, for example. Further, the width W1 of the chamfer portion 13 in the tread plan view and a length L1 (shown in FIG. 4) in the tire radial direction of the chamfer portion 13 preferably satisfy the relationship of the following expression (5), and more preferably satisfy the following expression (6).

$$W1 > L1 \tag{5}$$

$$0.35 \times W1 \leq L1 \leq 0.60 \times W1 \tag{6}$$

As shown in FIG. 4, it is preferred that the length L1 in the tire radial direction of the chamfer portion 13 and a block height (h1) satisfy the relationship of the following expression (7). Further, it is preferred that the length L1 in the tire radial direction of the chamfer portion 13 and the length L2 in the tire axial direction of the ground contacting surface 8 (shown in FIG. 3) satisfy the relationship of the following expression (8). By arranging the chamfer portions 13 configured as such in the entire region of the toe-side side edge 20, the wear resistance and the wet performance can be improved in a good balance.

$$h1 \times 5\% \leq L1 \leq h1 \times 20\% \tag{7}$$

$$L2 \times 0.3\% \leq L1 \leq L2 \times 5.0\% \tag{8}$$

Hereinafter, other embodiments of the present invention will be described. In the figures showing other embodiments, the elements already described are designated by the same reference numerals as those described above, and the above-described configurations can be applied.

Figure 6:
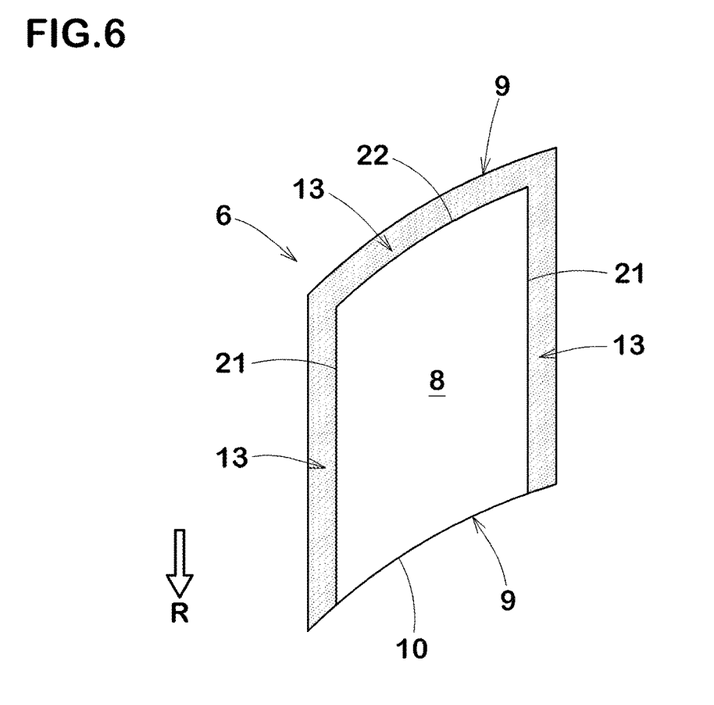
FIG. 6 an enlarged plan view of one of the blocks according to another embodiment of the present invention.

FIGS. 6 through 9 show enlarged plan views of the blocks 6 of other embodiments. As shown in FIG. 6, the heel-side edge 10 of this embodiment is curved so as to be concave toward the toe side. In addition, the side surfaces 9 connected to the heel-side edge 10 are curved so as to be concave toward the toe side. As a result, the side surfaces 9 can discharge a large amount of water, therefore, the wet performance is improved.

The toe-side edge 22 and the side surface 9 connected to the toe-side edge 22 with the chamfer portion 13 therebetween in this embodiment are curved so as to be convex toward the toe side. The blocks 6 configured as such can exert excellent wear resistance.

Figure 7:
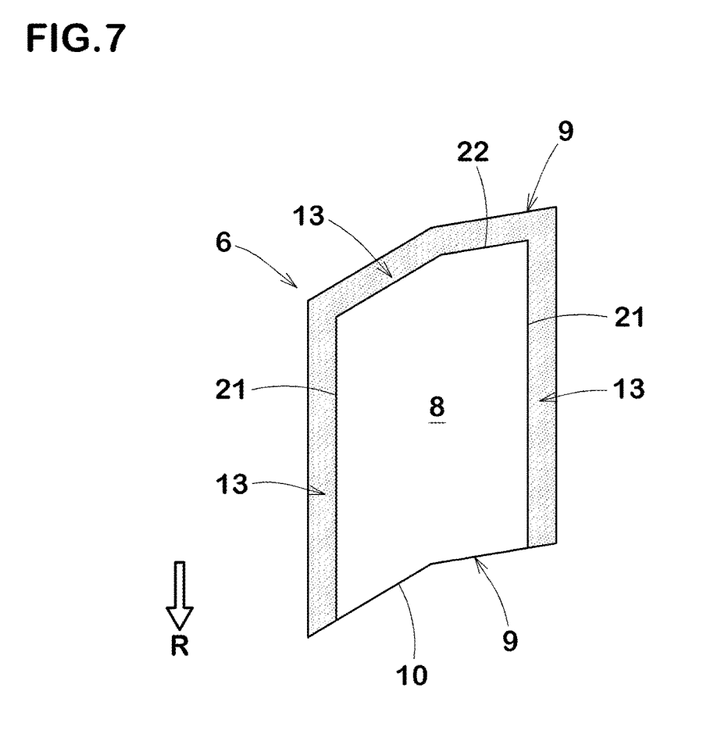
FIG. 7 an enlarged plan view of one of the blocks according to another embodiment of the present invention.

As shown in FIG. 7, the heel-side edge 10 of this embodiment is bent so as to be concave toward the toe side. Further, the side surface 9 connected to this heel-side edge 10 consists of two planes connected together by a ridge line extending in the tire radial direction, forming a surface concave toward the toe side. The blocks 6 configured as such can exert excellent wet performance.

The toe-side edge 22 of this embodiment is bent so as to be convex toward the toe side. Further, the side surface 9 connected to the toe-side edge 22 with the chamfer portion 13 therebetween consists of two planes connected together by a ridge line extending in the tire radial direction, forming a surface convex toward the toe side.

Figure 8:
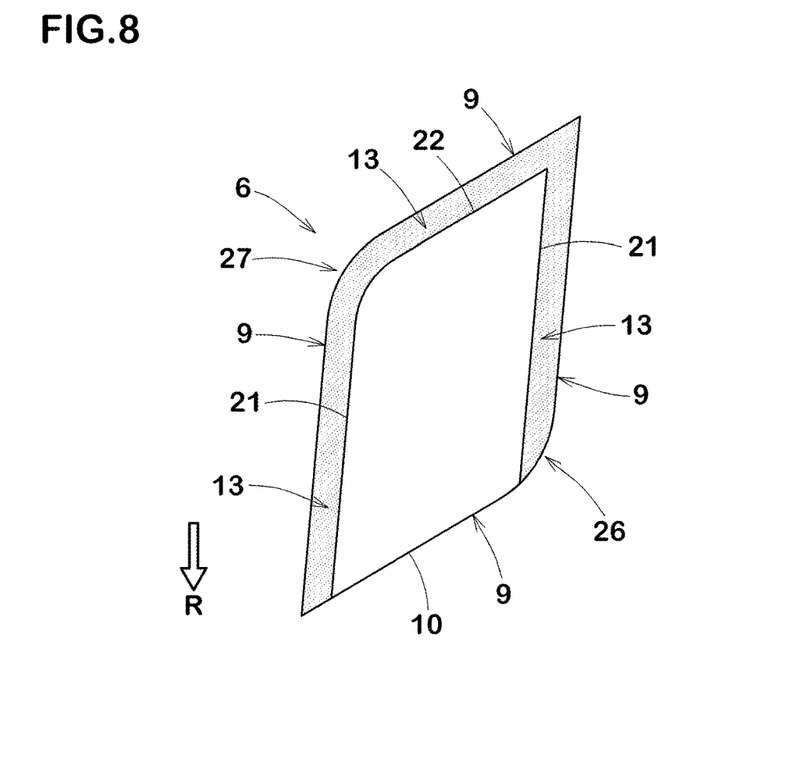
FIG. 8 an enlarged plan view of one of the blocks according to another embodiment of the present invention.

As shown in FIG. 8, in this embodiment, a first obtuse angle corner portion 26, in which one of the side surfaces 9 connected to the heel-side edge 10 and one of the side surfaces 9 positioned radially inside the side portion edges 21 are connected at an obtuse angle, is formed by a smoothly curved outer surface. Similarly, a second obtuse angle corner portion 27, in which one of the side surfaces 9 positioned radially inside the toe-side edge 22 and one of the side surfaces 9 positioned radially inside the side portion edges 21 are connected at an obtuse angle, is formed by a smoothly curved outer surface. The blocks 6 configured as such suppress local deformation at the corner portions described above and thus are useful for exerting excellent wear resistance and the steering stability. It should be noted that the smoothly curved outer surface means that the outer surface is continuously curved without forming a ridge line having a width of 0.5 mm or less.

Figure 9:
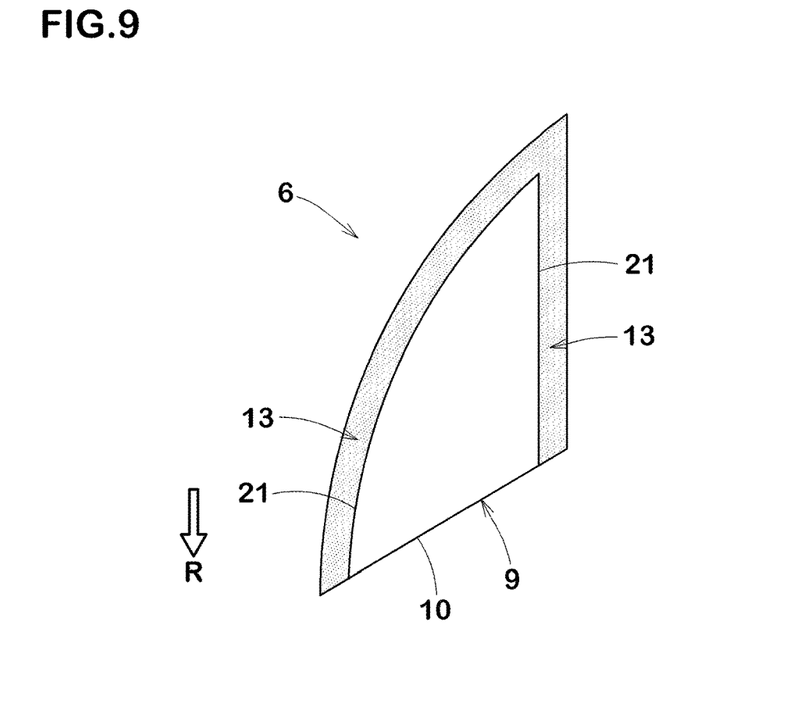
FIG. 9 an enlarged plan view of one of the blocks according to another embodiment of the present invention.

As shown in FIG. 9, in this embodiment, the width in the tire axial direction of each of the blocks 6 is gradually and continuously decreased as it goes toward the toe side. As a result, the ground contacting surface 8 of each of the blocks 6 is formed in a triangular shape. Here, the triangular configuration of the ground contacting surface 8 means that the ground contacting surface 8 is surrounded by three sides connecting the three vertices, and includes those having curved sides. In each of the blocks 6 shown in FIG. 9, the portion on the toe side is easily deformed appropriately in the tire axial direction, which can prevent the grooves from being clogged with mud or snow, for example.

Figure 10:
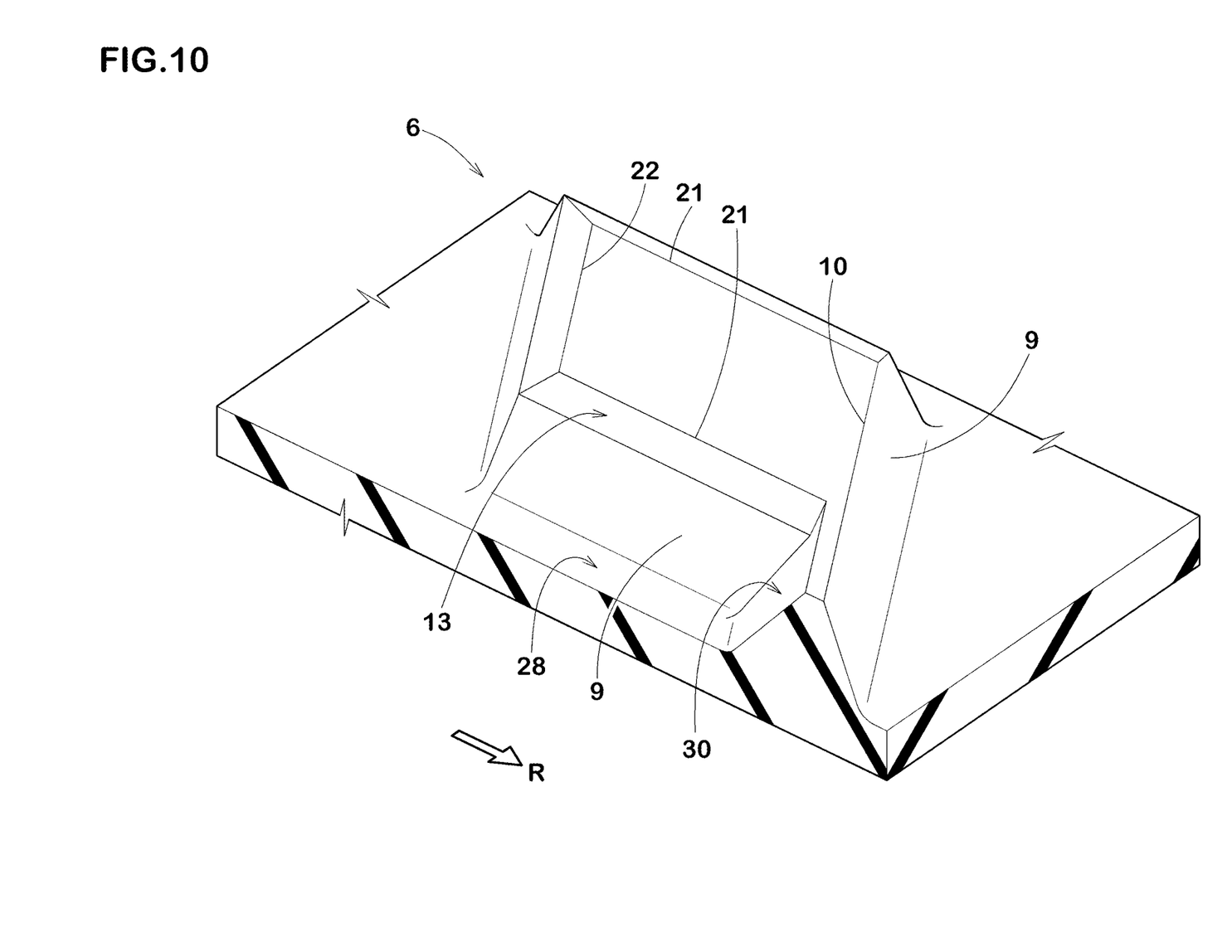
FIG. 10 an enlarged plan view of one of the blocks according to another embodiment of the present invention.

FIG. 10 shows an enlarged perspective view of one of the blocks 6 according to yet another embodiment. As shown in FIG. 10, in this embodiment, a groove 28 surrounding the block 6 includes a tie bar 30 formed by a groove bottom thereof being raised. The tie bar 30 is provided so as to connect two blocks 6 adjacent to each other, for example. The tie bars 30 configured as such suppress the deformation of the blocks 6, therefore, they are helpful for improving the steering stability and the wear resistance.

The tie bar 30 is connected to the side surface 9 connected to the heel-side edge 10, for example. In a preferred embodiment, a radial height of the tie bar 30 is substantially the same as the radial height of the block. In this embodiment, the radially outer surface of the tie bar 30 is connected to the ground contacting surface of the block 6. The tie bar 30 configured as such suppresses deformation around the heel-side edge 10 of the block 6 and improves the wet performance and the steering stability in a good balance.

While detailed description has been made of an embodiment of the present invention, the present invention can be embodied in various forms without being limited to the illustrated embodiment.

Example (Working Example)

Figure 11:
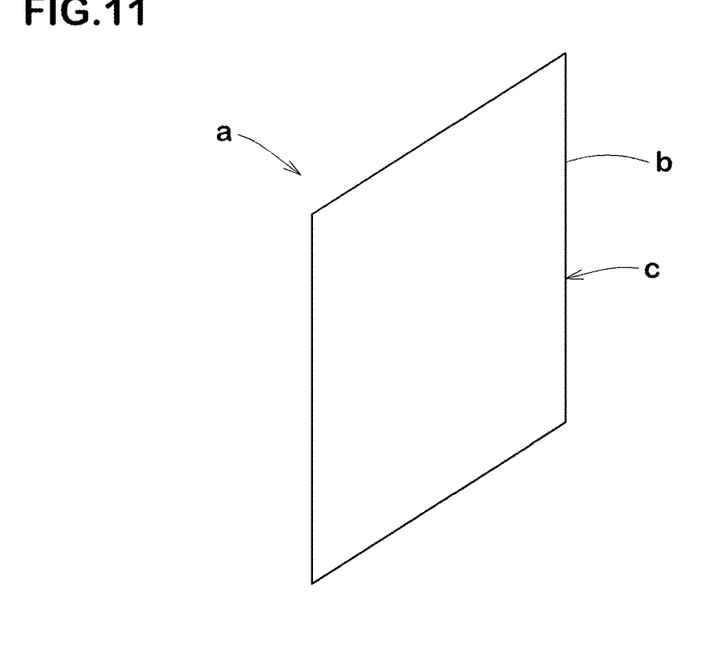
FIG. 11 an enlarged plan view of one of the blocks of Reference 1.
Figure 12:
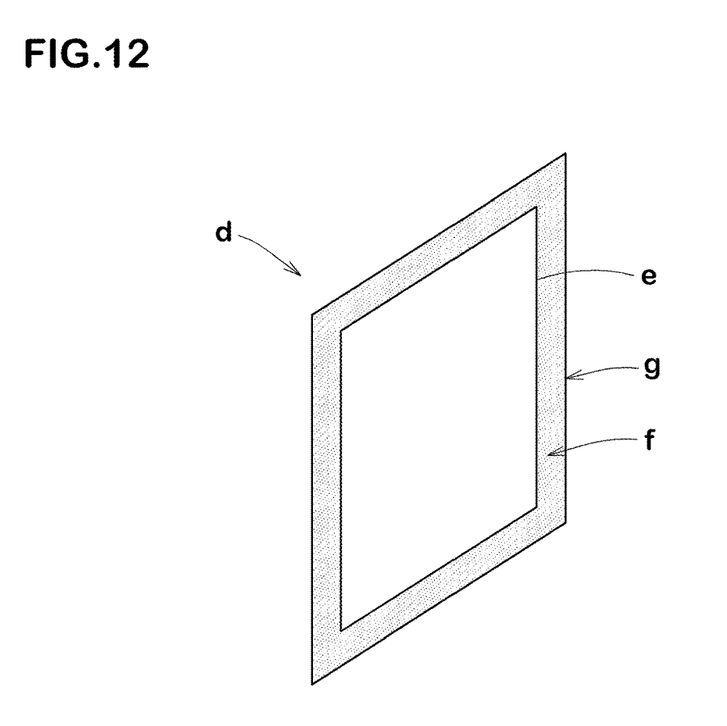
FIG. 12 an enlarged plan view of one of the blocks of Reference 2.

A pneumatic tires of size 245/40R18 having the blocks described above were made by way of test according to the specifications listed in Table 1. As Reference 1, as shown in FIG. 11, a tire was made by way of test in which the entire area of edges (b) of a block (a) was connected to side surfaces (c) without having a chamfer portion. As Reference 2, as shown in FIG. 12, a tire was made by way of test in which the entire area of edges (e) of a block (d) was connected to side surfaces (g) with chamfer portions (f) therebetween. Each of the test tires has substantially the same configuration, except for the block configuration. Each of the test tires was tested for the wet performance, the steering stability and the wear resistance. The common specifications and test methods for each of the test tires are as follows.

Tire rim: 18×8.5 J
Tire inner pressure: 200 kPa for all wheels
Test vehicle: 4WD-car with a displacement of 2000 cc
Test tire mounting position: all wheels
<Wet Performance>

Sudden braking was performed while the above test vehicle was driven on an asphalt road surface with a water film of 2 mm depth at 65 km/h, and the braking distance was measured. The results are the reciprocals of the braking distances described above, and are indicated by an index based on the value of the Reference 1 being 100. The higher the numerical value, the better the wet performance is.
<Steering Stability>

The maximum speed was measured when the above test vehicle was driven on an asphalt surface of 50 m radius to make a steady circular cornering with gradually increasing speed. The results are indicated by an index based on the numerical value of the Reference 1 being 100, wherein the larger the numerical value, the higher the maximum speed in the steady circular cornering described above is, which shows capability of exerting excellent steering stability.
<Wear Resistance>

After the above test vehicle was driven a certain distance on a dry road surface, remaining amount of the blocks was measured. The results are indicated by an index based on the remaining amount of the Reference 1 being 100, wherein the larger the numerical value, the better the wear resistance is.

It should be noted that, in the test results presented below, the sum of the evaluation points for each evaluation item may be used as an evaluation index for the overall performance of the tire. In other words, the sum of the evaluation points of the three evaluation items, the wet performance, the steering stability, and the wear resistance, may be used as an index indicating the overall performance of these items. Further, the sum of the evaluation points of two of the three evaluation items may be used as an index for evaluating the performance of the tire.

The test results are shown in Table 1.

TABLE 1

|  | Ref. 1 | Ref. 2 | Ex. 1 | Ex. 2 | Ex. 3 | Ex. 4 | Ex. 5 | Ex. 6 |
|---|---|---|---|---|---|---|---|---|
| Figure showing Block shape in plan view | FIG. 11 | FIG. 12 | FIG. 3 | FIG. 6 | FIG. 7 | FIG. 8 | FIG. 9 | FIG. 3 |
| Presence or Absence of Tie bar | Absence | Absence | Absence | Absence | Absence | Absence | Absence | Presence |
| Wet performance [evaluation point] | 100 | 102 | 107 | 108 | 106 | 106 | 108 | 108 |
| Steering stability [evaluation point] | 100 | 102 | 107 | 106 | 108 | 108 | 105 | 108 |
| Wear resistance [evaluation point] | 100 | 102 | 102 | 101 | 102 | 103 | 102 | 104 |

From the test results, it was confirmed that the tires in the Examples exerted excellent wet performance owing to the chamfered configuration.

Further, it was also confirmed that the tires in the Examples were excellent in the steering stability and the wear resistance.

DESCRIPTION OF REFERENCE SIGNS 2 tread portion
6 block
7 edge
8 ground contacting surface
9 side surface
10 heel-side edge
13 chamfer portion
15 toe-side region
20 toe-side side edge
R rotational direction

The invention claimed is:

1. A tire comprising:
a tread portion bound with an intended rotational direction, wherein
the tread portion is provided with at least one block,
each block includes a ground contacting surface and side surfaces, the ground contacting surface being defined by edges, and the side surfaces being positioned radially inside the ground contacting surface,
the edges include a heel-side edge located on a heel side in the rotational direction and a toe-side side edge extending toward a toe side in the rotational direction from the heel-side edge,
the heel-side edge is connected to one of the side surfaces without having a chamfer portion therebetween,
at least a toe-side region, which is a region positioned on the toe side in the rotational direction, of the toe-side side edge is connected to the side surfaces each with the chamfer portion therebetween, wherein
the toe-side side edge includes two side portion edges extending from both ends of the heel-side edge, and wherein
at least one of the two side portion edges is connected over an entire region thereof to one of the side surfaces with the chamfer portion therebetween.

2. The tire according to claim 1, wherein the toe-side side edge includes a toe-side edge which is opposite the heel-side edge and connects the two side portion edges.

3. The tire according to claim 1, wherein the ground contacting surface has a quadrangular shape.

4. The tire according to claim 1, wherein the heel-side edge extends at an angle of 30 degrees or less with respect to a tire axial direction.

5. The tire according to claim 1, wherein the heel-side edge is curved so as to be concave toward the toe side.

6. The tire according to claim 1, wherein a width of each chamfer portion is 5 mm or more and 15 mm or less in a tread plan view.

7. The tire according to claim 1, wherein a width of each chamfer portion is greater than a length in the tire radial direction of each chamfer portion in a tread plan view.

8. The tire according to claim 1, wherein a length in the tire radial direction of each chamfer portion is 0.3% or more and 5.0% or less of a length in a tire axial direction of the ground contacting surface.

9. The tire according to claim 1, wherein
each chamfer portion includes an inclined surface arranged between a respective one of the edges and a respective one of the side surfaces, and
in a lateral cross-sectional view of each block, the inclined surface is curved.

10. The tire according to claim 9, wherein the inclined surface is curved so as to be convex outward in the tire radial direction.

11. The tire according to claim 1, wherein
each block is surrounded by a plurality of grooves, and
one of the grooves includes a tie bar formed by a groove bottom thereof being raised.

12. The tire according to claim 11 wherein the tie bar is connected with one of the side surfaces which is connected with the heel-side edge.

13. The tire according to claim 1 wherein the two side portion edges extend parallel to each other.

14. The tire according to claim 2 wherein the toe-side edge extends parallel to the heel-side edge.

15. The tire according to claim 2 wherein the toe-side edge is connected in an entire region thereof to one of the side surfaces with the chamfer portion therebetween.

16. The tire according to claim 7 wherein the length in the tire radial direction of each chamfer portion in a tread plan view is 5% or more and 20% or less of a height in the tire radial direction of each block.

17. The tire according to claim 1 wherein the heel-side edge is bent so as to be concave toward the toe side.

18. The tire according to claim 11 wherein a height in the tire radial direction of the tie bar is substantially the same as a height in the tire radial direction of each block.

19. A tire comprising:
a tread portion bound with an intended rotational direction, wherein
the tread portion is provided with at least one block,
each block includes a ground contacting surface and side surfaces, the ground contacting surface being defined by edges, and the side surfaces being positioned radially inside the ground contacting surface, the edges include a heel-side edge located on a heel side in the rotational direction and a toe-side side edge extending toward a toe side in the rotational direction from the heel-side edge, the heel-side edge is connected to one of the side surfaces without having a chamfer portion therebetween, at least a toe-side region, which is a region positioned on the toe side in the rotational direction, of the toe-side side edge is connected to the side surfaces each with the chamfer portion therebetween, wherein the toe-side side edge includes two side portion edges extending from both ends of the heel-side edge, and wherein both of the two side portion edges are connected over an entire region thereof to the side surfaces each with the chamfer portion therebetween.

\* \* \* \* \*